(12) United States Patent
Baldwin

(10) Patent No.: US 10,418,616 B2
(45) Date of Patent: Sep. 17, 2019

(54) BATTERY TERMINAL COVER

(71) Applicant: Levy Devay, LLC, Troy, MI (US)

(72) Inventor: Michael Baldwin, Waterford, MI (US)

(73) Assignee: Levy Devay, LLC, Troy, MI (US)

( * ) Notice: Subject to any disclaimer, the term of this patent is extended or adjusted under 35 U.S.C. 154(b) by 291 days.

(21) Appl. No.: 15/418,841

(22) Filed: Jan. 30, 2017

(65) Prior Publication Data

US 2017/0141377 A1    May 18, 2017

Related U.S. Application Data

(63) Continuation-in-part of application No. PCT/US2016/019127, filed on Feb. 23, 2016, and a continuation-in-part of application No. 14/631,882, filed on Feb. 26, 2015, now Pat. No. 9,559,342.

(51) Int. Cl.
*H01M 2/34* (2006.01)
*H01M 2/30* (2006.01)

(52) U.S. Cl.
CPC .............. *H01M 2/30* (2013.01); *H01M 2/34* (2013.01)

(58) Field of Classification Search
CPC ........ H01M 2/344; H01M 2/34; H01R 11/284
See application file for complete search history.

(56) References Cited

U.S. PATENT DOCUMENTS

| | | | |
|---|---|---|---|
| 1,633,176 A * | 6/1927 | Goeller | H01R 11/284 439/202 |
| 2,145,135 A | 1/1939 | Ryalls | |
| 5,147,219 A | 9/1992 | Gilberts et al. | |
| 5,346,782 A * | 9/1994 | Julian | H01M 2/344 174/138 F |
| 2004/0209164 A1 * | 10/2004 | Wada | H01M 2/30 429/181 |
| 2005/0159022 A1 | 7/2005 | Nagata | |
| 2006/0264108 A1 | 11/2006 | Shimamori et al. | |

OTHER PUBLICATIONS

Keystone Electronics Corporation, "Protective Cap for 9 Volt Battery P/N 96," May 6, 2013. Product Catalog; http://www.keyelco.com/product.cfm/product_id/1069.

* cited by examiner

*Primary Examiner* — Maria Laios
(74) *Attorney, Agent, or Firm* — Harness, Dickey & Pierce, P.L.C.

(57) ABSTRACT

A battery terminal protection assembly includes a battery having at least one terminal with a plurality of tabs. A cover for protecting the battery terminal includes a cap including an outer wall and a plurality of inner segments attached to the outer wall and including a radially outwardly extending ledge adjacent the bottom surface of the inner segments. The cap being placed overtop of the terminal with the radially outwardly extending ledges engaging the plurality of tabs. An insert including a top portion with a post extending from a bottom surface of the top portion and the post including a first radially outwardly extending flange, the post being received within the cap so that the first radially outwardly extending flange engages the inner segment in an abutting relationship to secure the radially outwardly extending ledge in engagement with the one of the plurality of tabs.

20 Claims, 7 Drawing Sheets

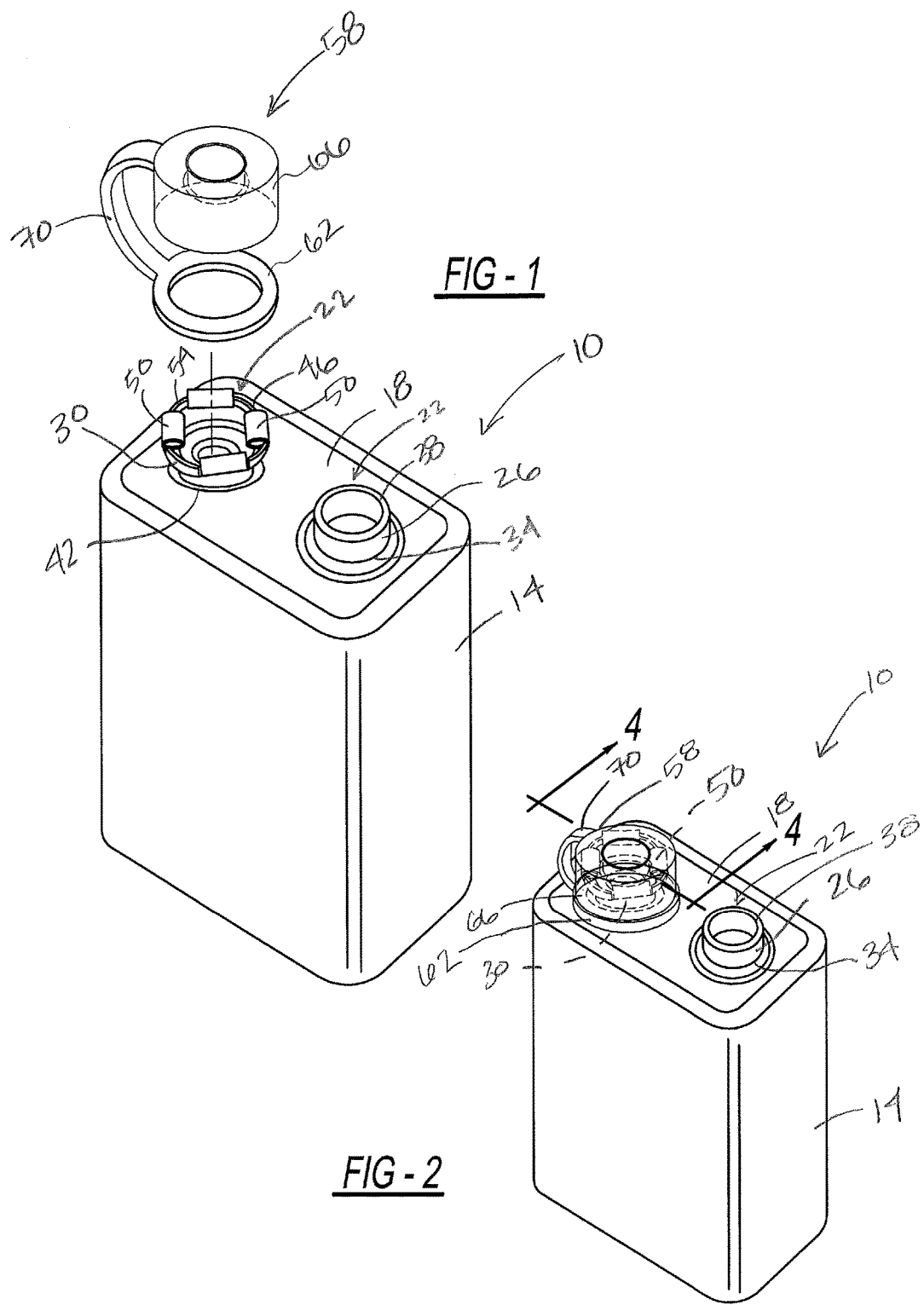

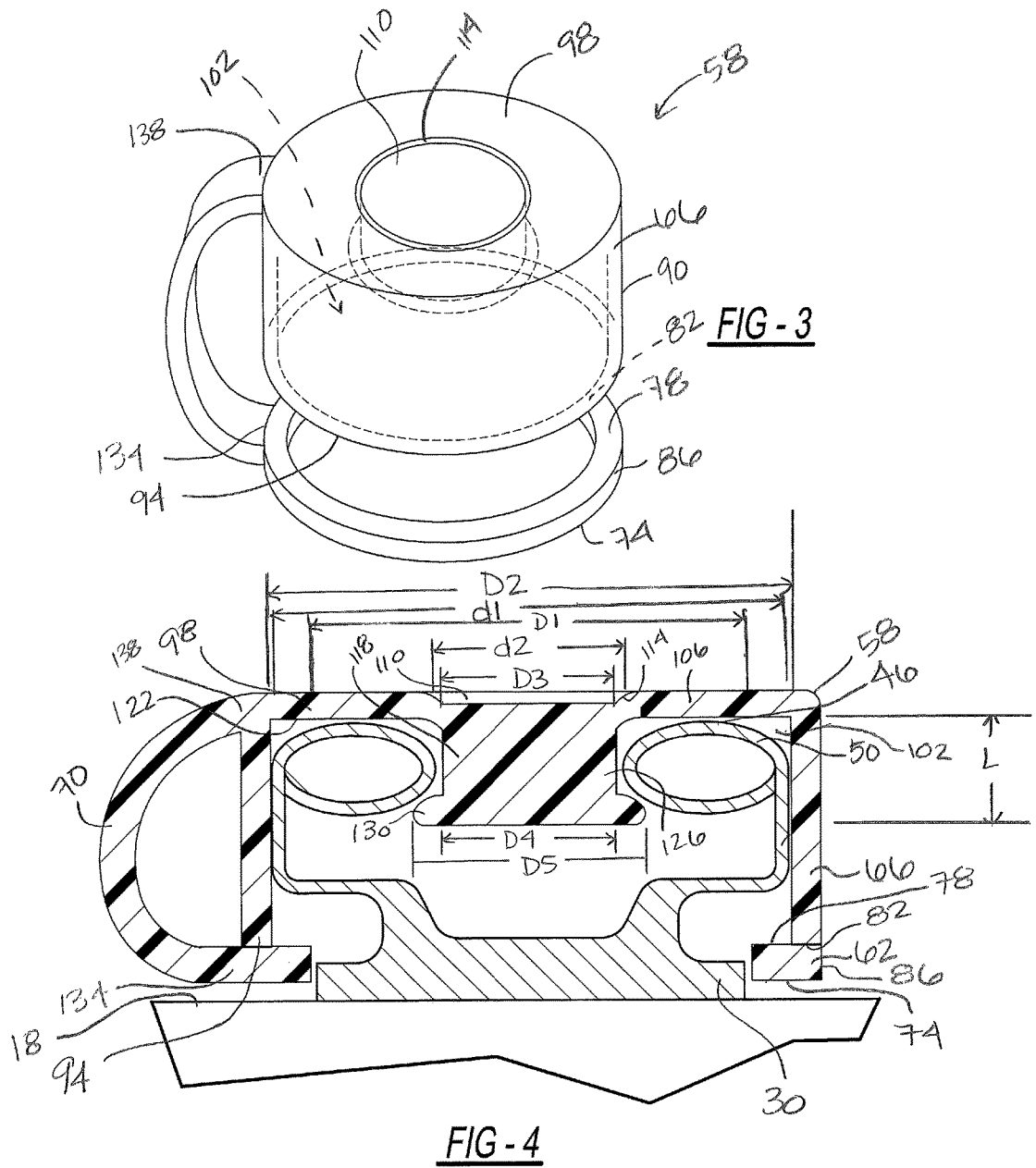

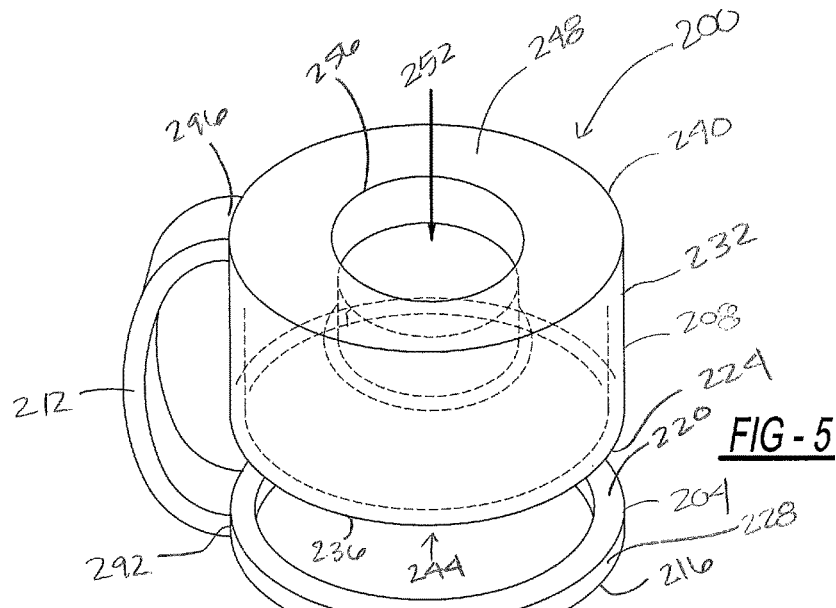
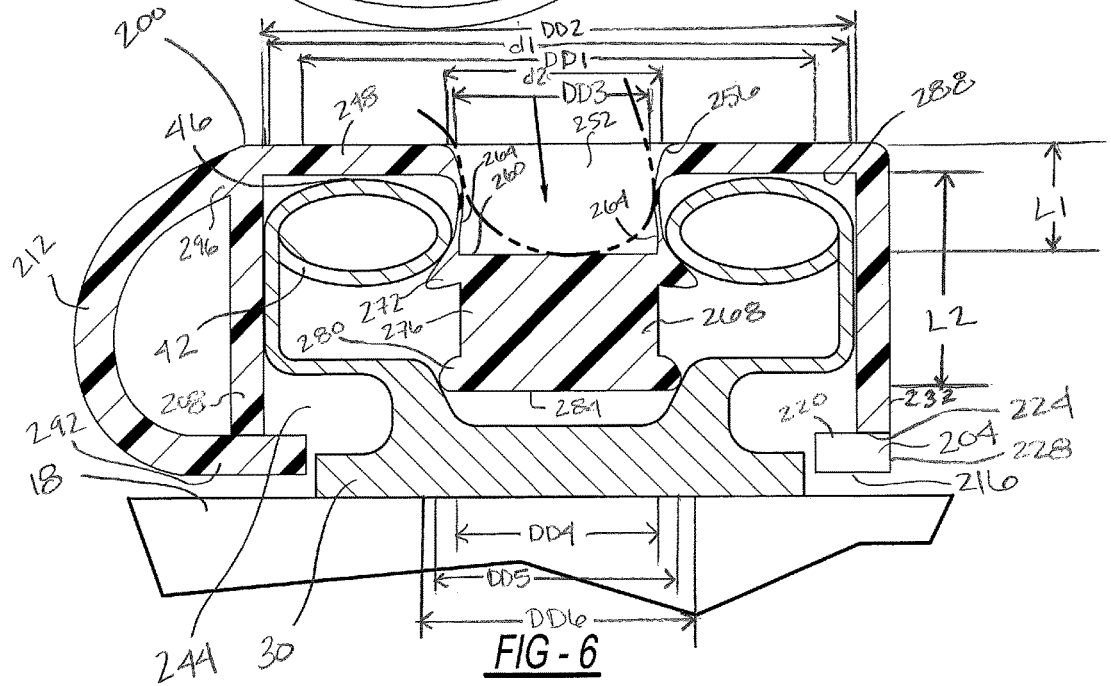

BATTERY TERMINAL COVER

CROSS-REFERENCE TO RELATED APPLICATIONS

This application is a continuation-in-part application of United States patent application Ser. No. 14/631,882 filed on Feb. 26, 2015.

FIELD

The present disclosure relates to batteries, and, specifically, to battery terminal covers.

BACKGROUND

This section provides background information related to the present disclosure and is not necessarily prior art.

The most common form of nine-volt battery has a rectangular prism shape with rounded edges and a polarized snap connector at the top. This format is commonly available in primary carbon-zinc and alkaline chemistry, in primary lithium iron disulfide, and in rechargeable form in nickel-cadmium, nickel-metal hydride and lithium-ion.

Most nine-volt alkaline batteries are constructed of six individual 1.5V LR61 cells enclosed in a wrapper. These cells are slightly smaller than LR8D425 AAAA cells and can be used in their place for some devices, even though they are 3.5 mm shorter. Carbon-zinc types are made with six flat cells in a stack, enclosed in a moisture-resistant wrapper to prevent drying.

Lithium 9-volt batteries are consumer-replaceable, high energy density batteries designed to last up to 5 times longer than alkaline 9-volt batteries and up to 10 times longer than carbon-zinc 9-volt batteries in many applications. In addition, lithium PP3 batteries have a long shelf life of up to 10 years.

The battery has both terminals in a snap connector on one end. The smaller circular (male) terminal is positive, and the larger hexagonal or octagonal (female) terminal is the negative contact. The connectors on the battery are the same as on the connector itself; the smaller one connects to the larger one and vice versa. The same snap style connector is used on other battery types in the Power Pack (PP) series. Battery polarization is normally obvious since mechanical connection is usually only possible in one configuration. Several nine-volt batteries can be connected to each other in series to provide higher voltages.

SUMMARY

This section provides a general summary of the disclosure, and is not a comprehensive disclosure of its full scope or all of its features.

A battery terminal protection assembly includes a battery having at least one terminal with a plurality of tabs. A cover for protecting the battery terminal includes a cap including an outer wall and a plurality of inner segments attached to the outer wall and including a radially outwardly extending ledge adjacent the bottom surface of the inner segments. The cap being placed overtop of the terminal with the radially outwardly extending ledges engaging the plurality of tabs. An insert including a top portion with a post extending from a bottom surface of the top portion and the post including a first radially outwardly extending flange, the post being received within the cap so that the first radially outwardly extending flange engages the inner segment in an abutting relationship to secure the radially outwardly extending ledge in engagement with the one of the plurality of tabs.

A cap configured to cover a terminal of a battery may include a base and a top having a plug and a cavity. The cavity is configured to receive the terminal and the plug is configured to retain the top on the terminal. A tether has a first end fixed to the base and a second end fixed to the top and connects the top to the base. The base is configured to retain the top to the terminal when the top is both connected to the terminal and separate from the terminal.

The cap may further include a plug further having a foot portion configured to retain the plug within the terminal.

The cap may further include a diameter of the foot portion of the plug configured to be greater than a diameter of a plurality of tabs of the terminal such that the foot portion deforms when pressed through the tabs and expands on an opposite side of the tabs to retain the foot portion on the opposite side of the tabs.

The cap may further include a plug having a peak portion. The foot portion and the peak portion may be separated by a body portion and a diameter of the peak portion may be greater than a diameter of the foot portion which is greater than a diameter of the body portion.

The cap may further include a peak portion and foot portion that are configured to deform when pressed through a plurality of tabs of the terminal and expand on an opposite side of the tabs to retain the foot portion and the peak portion on the opposite side of the tabs.

The cap may further include an indentation in a top wall of the top. The plug may extend from a base of the indentation.

The cap may further include a side wall of the indentation that is configured to deform around a plurality of tabs of the terminal to retain the top on the terminal.

The cap may further include a top and base that are formed from an elastically deformable material.

The cap may further include a top and base that are formed from an electrically insulating material.

A cover to protect a battery terminal may include a base and a top having a cylindrical wall, an open end, and a closed end. The closed end has an end wall connected to the cylindrical wall. A cavity within the top receives the battery terminal. The open end provides access to the cavity. A plug extends into the cavity from the end wall for engaging the battery terminal. A tether has a first end fixed to the base and a second end fixed to the top and connects the top to the base.

The cover may further include a plug that has a body portion and a foot portion configured to retain the plug within the terminal.

The cover may further include a diameter of the foot portion of the plug that is greater than a diameter of the body portion.

The cover may further include a plug that has a peak portion. The foot portion and the peak portion are separated by the body portion, and a diameter of the peak portion is greater than a diameter of the foot portion and the body portion.

The cover may further include a peak portion and foot portion that are configured to deform when pressed through a plurality of tabs of the battery terminal and expand on an opposite side of the tabs to retain the foot portion and the peak portion on the opposite side of the tabs.

The cover may further include an indentation in the end wall. The plug extends into the cavity from a base of the indentation.

The cover may further include a side wall of the indentation that is configured to deform around a plurality of tabs on the battery terminal to retain the top on the battery terminal.

The cover may further include a base that is configured to retain the top to the battery terminal when the top is both connected to the battery terminal and separate from the battery terminal.

The cover may further include a plug that is cylindrical.

The cover may further include a top and base that are formed from an elastically deformable material.

The cover may further include a top and base that are formed from an electrically insulating material.

A battery terminal protection assembly may include a battery having at least one terminal, a plurality of tabs extending from the terminal, and a cover for protecting the battery terminal. The cover may further include a base surrounding the terminal and a top having an open end, and a closed end. A cavity within the top may receive the terminal, and the open end provides access to the cavity. A plug extends into the cavity from the end wall and engages the plurality of tabs extending from the terminal. A tether has a first end fixed to the base and a second end fixed to the top and connects the top to the base. The base is configured to retain the top to the terminal when the top is both connected to the terminal and separate from the terminal.

The battery terminal protection assembly may further include a plug having a body portion and a foot portion configured to retain the plug within the terminal. A diameter of the foot portion of the plug is greater than a diameter of the plurality of tabs and a diameter of the body such that the foot portion deforms when pressed through the tabs and expands on an opposite side of the tabs to retain the foot portion on the opposite side of the tabs.

The battery terminal protection assembly may further include a plug having a peak portion. The foot portion and the peak portion are separated by a body portion. A diameter of the peak portion is greater than the diameter of the foot portion and the diameter of the body portion. The peak portion and foot portion deform when pressed through the plurality of tabs and expand on an opposite side of the tabs to retain the foot portion and the peak portion on the opposite side of the tabs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an elevated perspective view of a battery and cover according to the present disclosure;

FIG. 2 is an elevated perspective view of the assembled battery and cover of FIG. 1;

FIG. 3 is a perspective view of the cover of FIG. 1;

FIG. 4 is a section view cut at 4-4 in FIG. 1;

FIG. 5 is another embodiment of a cover according to the present disclosure;

FIG. 6 is a section view of the cover of FIG. 5 cut in the same location as section 4-4 in FIG. 1;

Corresponding reference numerals indicate corresponding parts throughout the several views of the drawings.

DETAILED DESCRIPTION

Figure 7:
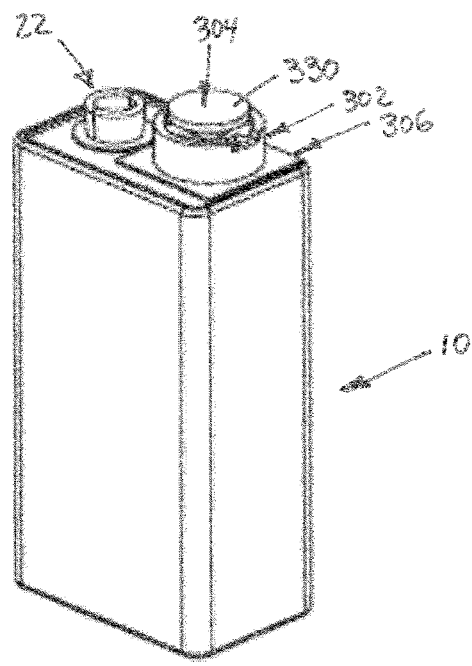
FIG. 7 is a perspective view of a battery and terminal cover assembly according to a further embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. FIGS. 1-6 illustrate various example embodiments of a cover for a battery terminal. The cover is configured to protect and/or electrically insulate the battery terminal from establishing an undesired current between the positive and negative terminals such as by coming into contact with an electrically conductive article.

Now referring to FIGS. 1 and 2, a battery 10 is illustrated having a container 14 with a top wall 18. The battery may have a rectangular prism shape with rounded edges and a polarized snap connector for the top wall 18. For example, the battery may be a nine (9) volt battery, and may be lithium, lithium-ion, alkaline, or NiMH. The container 14 may be formed of a rectangular metal jacket or wrapper and may hold a plurality of smaller cells wired in series (not shown). For example only, six individual 1.5 volt LR61 cells may be enclosed in the container 14. A plurality of terminals 22 extend from the top wall 18 of the container 14 and electrically connect the battery 10 to other devices. The terminals 22 may include a positive terminal 26 and a negative terminal 30.

The positive terminal 26 is a circular connector. The positive terminal 26 may be cylindrical with a first end 34 connected to the top wall 18 and an opposite second end 38 extended away from the first end 34 and top wall 18. A connector (not illustrated) may receive the second end 38 for forming an electrical connection.

The negative terminal 30 may be crown-shaped, square, hexagonal, octagonal, or any other polygon. A first end 42 of the negative terminal 30 may be connected to the top wall 18 and an opposite second end 46 of the negative terminal 30 may extend away from the first end 42 and the top wall 18. A plurality of tabs 50 may be crimped to form cylinders around a top surface 54 of the second end 46.

Additionally referring to FIGS. 3 and 4, a cover or cap 58 is assembled on at least one of the terminals 22, for example only, the negative terminal 30. While the cover 58 is described and illustrated as assembled on the negative terminal 30, it is understood that the cover 58 or an additional cover 58 may be assembled on the positive terminal 26, and the same concepts apply to the assembly of the cover 58 on the positive terminal 26. The cover 58 has a base 62 and a top 66 that are connected by a tether 70.

The base 62 may be a circular ring with an inner diameter D1 that is smaller than an outer diameter d1 of the second end 46 of the negative terminal 30 such that when assembled the base 62 is retained on the negative terminal 30. A bottom wall or face 74 of the base 62 may face, be adjacent to, and/or lay upon top wall 18 of the battery 10. A top wall or face 78 of the base 62 may face an opposite direction as bottom wall 74 and may mate with a bottom wall or face 82 of top 66 when the top 66 is positioned over the negative terminal 30. An outer wall 86 of base 62 may align with an outer wall 90 of top 66 such that when the top 66 is positioned over the negative terminal 30, the outer wall 86 of the base 62 is flush with the outer wall 90 of the top 66.

The top 66 may be cylindrically shaped with an open bottom end 94 and a sealed top end 98. The open bottom end 94 may provide access to a cavity 102 within the cylindrically shaped top 66 for receiving the negative terminal 30. The top end 98 may include a wall 106 having a circular indentation, depression, or dimple 110 centered within it. A diameter D3 of the indentation 110 may be less than an inner diameter d2 of the tabs 50 of the negative terminal 30. An edge 114 where the indentation 110 meets the wall 106 may be chamfered or rounded.

An inner plug 118 may extend from an inner face 122 of the wall 106 toward the bottom end 94 of the top 66. The plug 118 may have a cylindrical body portion 126 and a foot portion 130 and may engage the negative terminal 30 when assembled on the negative terminal 30. A diameter D4 of the body portion 126 may be the same as the diameter D3 of the indentation 110. A diameter D5 of the foot 130 may be greater than the diameter D4 of the body portion 126 such that the foot 130 increases in circumference from the body portion 126. The plug 118 may extend a length L from the inner face 118 such that when the top 66 is placed over the negative terminal 30, the foot 130 is beyond the tabs 50. The diameter D5 of the foot 130 is greater than the inner diameter d2 of the tabs 50 such that when the top 66 is placed over the negative terminal 30, the tabs 50 retain the foot 130 within the negative terminal 30.

The tether 70 may be a strip connecting the base 62 with the top 66. The tether 70 may be rectangular-shaped, having four flat sides. In other embodiments, the tether 70 may be cylindrically or otherwise shaped, so long as the tether 70 connects the base 62 with the top 66. A first end 134 may be fixed to the base 62, and a second end 138 may be fixed to the top 66. The tether 70 allows the base 62 and top 66 to remain attached, connected, or tethered while the base 62 is assembled and retained on the negative terminal 30 and the top 66 is removed from or off of the negative terminal 30, such as when the battery 10 is electrically connected to another device.

The cover 58 may be elastically deformable such that the base 62 may stretch or deform to fit over the tabs 50 and then return to the original shape or configuration such that the tabs 50 retain the base 62 on the negative terminal 30. The cover 58 may also be elastically deformable such that the foot 130 of the plug 118 on the top 66 may deform or compress to fit within the tabs 50 and then expand to the original shape such that the tabs 50 retain the top 66 on the negative terminal 30. The cover 58 may further be elastically deformable such that the tether 70 may keep the top 66 and the base 62 connected without breaking. For example, the tether 70 may stretch, bend, twist, or deform without breaking to retain the connection between the top 66 and base 62. The cover 58 may also be electrically insulating for increased safety and battery life.

Thus, the cover 58 may be formed of an elastically deformable, insulating material, such as, for example, polyethylene, silicone rubber, neoprene, ABS plastic, polyurethane, or any other elastically deformable, insulating material. The cover 58 may also be formed of a material resistant to corrosion or decomposition from battery acid.

With continued reference to FIGS. 1-4, the cover 58 may be assembled onto the negative terminal 30 (or in other embodiments the positive terminal 26) by stretching or deforming the base 62 to fit over the tabs 50 of the negative terminal 30. Once the base 62 is over the tabs 50, the base 62 may return to the original size and/or configuration, such that the tabs 50 retain the base 62 on the negative terminal. Since the inner diameter D1 of the base 62 is less than the outer diameter d1 of the tabs 50, the tabs 50 retain the base 62 on the negative terminal 30 such that the base 62 does not slide off the negative terminal 30.

The top 66 may be pressed onto the negative terminal 30 (or, in other embodiments the positive terminal 26). Open bottom end 94 may be inserted over the negative terminal 30 such that the negative terminal 30 is received within the cavity 102. The inner diameter D2 of the top 66 is slightly greater than the outer diameter d1 of the tabs 50 such that the tabs 50 may contact the top 66 when the top 66 is assembled on the negative terminal 30. As a force is applied to the end 98 of the top 66 to press the top 66 onto the negative terminal 30, the foot portion 130 of the plug 118 extending from the inner face 122 of the top 66 deforms by decreasing the diameter D5 of the foot 130 to fit within the smaller diameter d2 of the tabs 50. Once the foot portion 130 has been pushed beyond the tabs 50, the foot portion 130 returns to the original shape such that the diameter D5 is larger than the diameter d2. The smaller diameter d2 of the tabs 50 retains the foot portion 130 within the negative terminal 30, maintains engagement between the plug 118 and the negative terminal 30, and retains the top 66 on the negative terminal 30. An assembled view of the cover 58 on the battery is shown in FIGS. 2 and 4.

Now referring to FIGS. 5 and 6, another embodiment of a cover or cap 200 is illustrated. Similarly to the cover 58, the cover 200 has a base 204 and a top 208 that are connected by a tether 212. The references and description of the battery 10 and terminals 22 are the same as previously described.

The base 204 may be a circular ring with an inner diameter DD1 that is smaller than the outer diameter d1 of the second end 46 of the negative terminal 30 such that when assembled the base 204 is retained on the negative terminal 30. A bottom wall or face 216 of the base 204 may face, be adjacent to, and/or lay upon top wall 18 of the battery 10. A top wall or face 220 of the base 204 may face an opposite direction as bottom wall 216 and may mate with a bottom wall or face 224 of top 208 when the top 208 is positioned over the negative terminal 30. An outer wall 228 of base 204 may align with an outer wall 232 of top 208 such that when the top 208 is positioned over the negative terminal 30, the outer wall 228 of the base 204 is flush with the outer wall 232 of the top 208.

The top 208 may be cylindrically shaped with an open bottom end 236 and a sealed top end 240. The open bottom end 236 may provide access to a cavity 244 within the cylindrically shaped top 208 for receiving the negative terminal 30. The top end 240 may include a wall 248 having a circular indentation, depression, or bore 252 centered within it. A diameter DD3 of the indentation 252 may be less than an inner diameter d2 of the tabs 50 of the negative terminal 30. An edge 256 where the indentation 252 meets the wall 248 may be chamfered or rounded. A depth L1 of the indentation 252 may be a distance such that a base 260 of the indentation 252 extends just beyond a position of the inner diameter d2 of the tabs 50. Thus, a wall 264 of the indentation 252 deforms to accommodate the tabs 50.

An inner plug 268 may extend from the base 260 of the indentation 252. The plug 268 may have a top peak or tab 272, a cylindrical body portion 276, and a foot portion 280 and may engage the negative terminal 30 when assembled on the negative terminal 30. The cylindrical body portion 276 and foot portion 280 may be similar to body portion 126 and foot portion 130 as previously described. A diameter DD4 of the body portion 276 may be approximately equal to the diameter DD3 of the indentation 252. A diameter DD5 of the foot 280 may be greater than the diameter DD4 of the body portion 276 such that the foot 280 increases in circumference from the body portion 276. A diameter DD6 of the peak 272 may be greater than the diameter DD4 of the body portion 276 and approximately equal to or greater than the diameter DD5 of the foot 280 such that the peak 272 increases in circumference from the body portion 276. A base 284 of the plug 268 may extend a length L2 from an inner face 288 of the wall 248 such that when the top 208 is placed over the negative terminal 30, the peak 272 and the foot 280 are beyond the tabs 50. The diameter DD5 of the foot 280 and the diameter DD6 of the peak 272 are greater than the inner diameter d2 of the tabs 50 such that when the top 208 is placed over the negative terminal 30, the tabs 50 retain the foot 280 and peak 272 within the negative terminal 30.

The tether 212 may be a strip connecting the base 204 with the top 208. The tether 212 may be rectangular-shaped, having four flat sides. In other embodiments, the tether 212 may be cylindrically or otherwise shaped, so long as the tether 212 connects the base 204 with the top 208. A first end 292 may be fixed to the base 204, and a second end 296 may be fixed to the top 208. The tether 212 allows the base 204 and top 208 to remain attached, connected, or tethered while the base 204 is assembled and retained on the negative terminal 30 and the top 208 is removed from or off of the negative terminal 30, such as when the battery 10 is electrically connected to another device.

The cover 200 may be elastically deformable such that the base 204 may stretch or deform to fit over the tabs 50 and then return to the original shape or configuration such that the tabs 50 retain the base 204 on the negative terminal 30. The cover 200 may also be elastically deformable such that the peak 272 and the foot 280 of the plug 268 on the top 208 may deform or compress to fit within the tabs 50 and then expand to the original shape such that the tabs 50 retain the top 208 on the negative terminal 30. The cover 200 may further be elastically deformable such that the tether 212 may keep the top 208 and the base 204 connected without breaking. For example, the tether 212 may stretch, bend, twist, or deform without breaking to retain the connection between the top 208 and base 204. The cover 200 may also be electrically insulating for increased safety and battery life.

Thus, the cover 200 may be formed of an elastically deformable, insulating material, such as, for example, polyethylene, silicone rubber, neoprene, ABS plastic, polyurethane, or any other elastically deformable, insulating material. The cover 200 may also be formed of a material resistant to corrosion or decomposition from battery acid.

With continued reference to FIGS. 5 and 6, the cover 200 may be assembled onto the negative terminal 30 (or in other embodiments the positive terminal 26) by stretching or deforming the base 204 to fit over the tabs 50 of the negative terminal 30. Once the base 204 is over the tabs 50, the base 204 may return to the original size and/or configuration, such that the tabs 50 retain the base 204 on the negative terminal. Since the inner diameter DD1 of the base 204 is less than the outer diameter d1 of the tabs 50, the tabs 50 retain the base 204 on the negative terminal 30 such that the base 204 does not slide off the negative terminal 30.

The top 208 may be pressed onto the negative terminal 30 (or, in other embodiments the positive terminal 26). Open bottom end 236 may be inserted over the negative terminal 30 such that the negative terminal 30 is received within the cavity 244. The inner diameter DD2 of the top 208 is slightly greater than the outer diameter d1 of the tabs 50 such that the tabs 50 may contact the top 208 when the top 208 is assembled on the negative terminal 30. As a force is applied to the end 240 of the top 208 to press the top 208 onto the negative terminal 30, the foot portion 280 of the plug 268 extending from the wall 248 of the top 208 deforms by decreasing the diameter DD5 of the foot 280 to fit within the smaller diameter d2 of the tabs 50. Once the foot portion 280 has been pushed beyond the tabs 50, the foot portion 280 returns to the original shape such that the diameter DD5 is larger than the diameter d2.

Continued force is applied to the end 240 of the top 208. The peak portion 272 of the plug 268 extending from the wall 248 of the top 208 deforms by decreasing the diameter DD6 of the peak 272 to fit within the smaller diameter d2 of the tabs 50. Once the peak portion 272 has been pushed beyond the tabs 50, the peak portion 272 returns to the original shape such that the diameter DD6 is larger than the diameter d2. The smaller diameter d2 of the tabs 50 retains the foot portion 280 and the peak portion 272 within the negative terminal 30, maintains engagement between the plug 268 and the negative terminal 30, and retains the top 208 on the negative terminal 30.

Once the peak portion 272 is pushed beyond the tabs 50, the wall 264 of the indentation 252 deforms around the tabs 50 to engage with the tabs 42 and applies additional pressure to the tabs 50 to retain the top 208 on the negative terminal 30. An assembled view of the cover 200 on the battery is shown in FIG. 6.

With reference to FIGS. 7-13, a further alternative embodiment of the battery terminal cover assembly 300 for use with a battery 10 as described previously, will now be described. The battery terminal cover assembly 300 includes a cap 302, an insert 304 and a patch 306 which can be assembled together to cover a terminal 22 of the battery 10.

Figure 8:
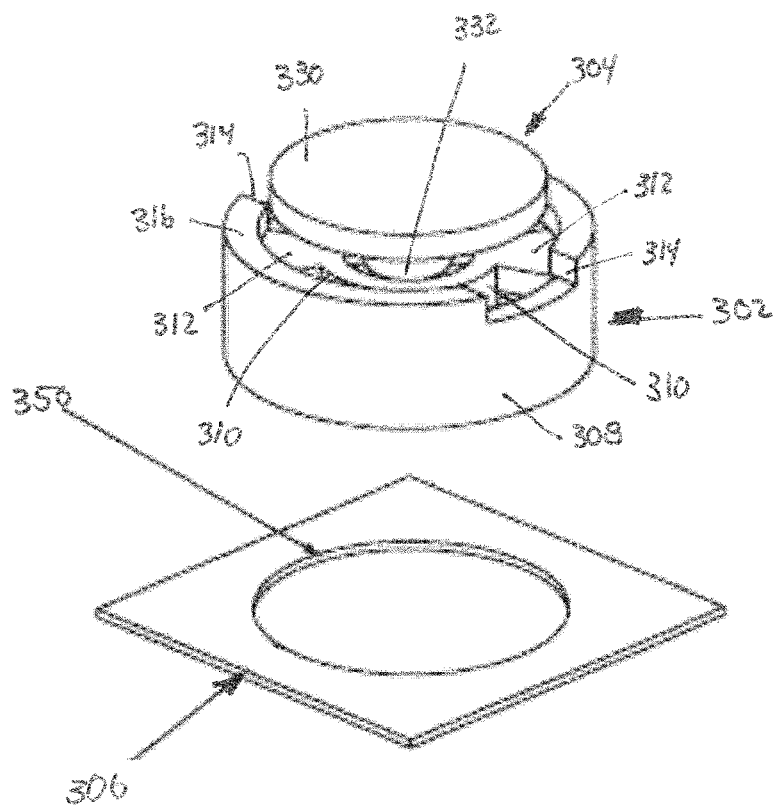
FIG. 8 is perspective view of the terminal cover assembly shown in FIG. 7.
Figure 9:
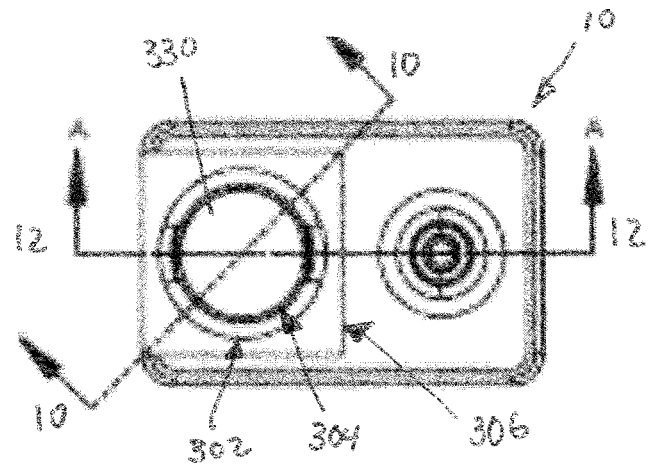
FIG. 9 is a top plan view of the battery and terminal cover assembly of FIG. 7.
Figure 10:
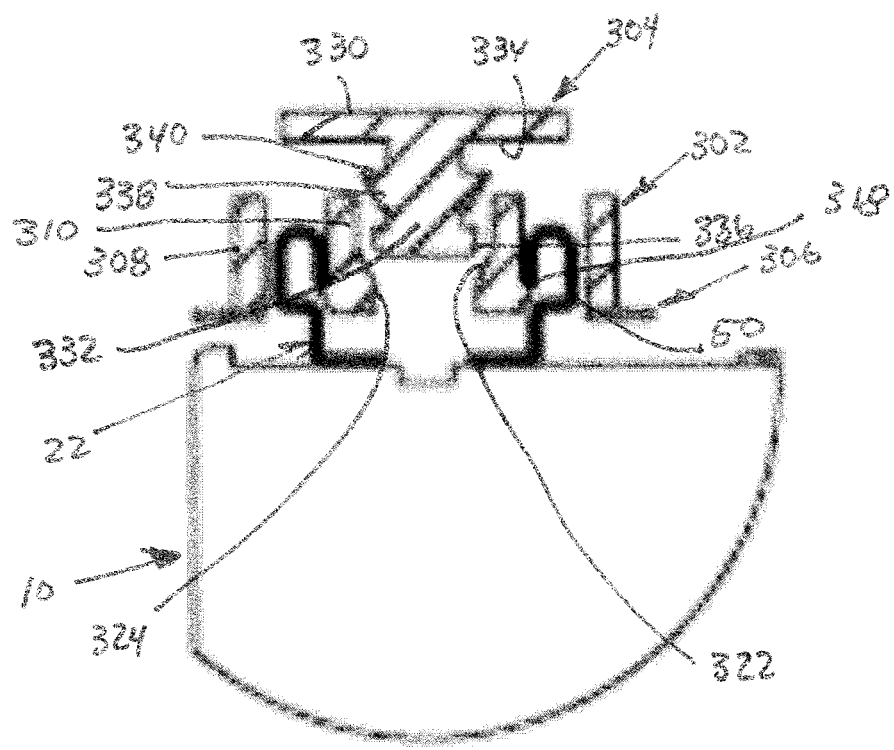
FIG. 10 is a section view of the terminal and terminal cover assembly in a disengaged state taken along line 10-10 of FIG. 9.
Figure 11:
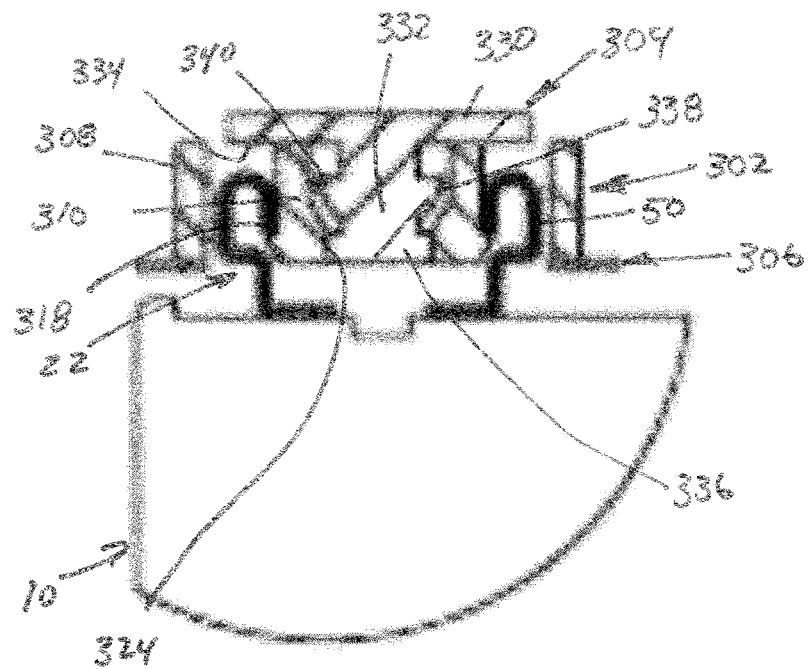
FIG. 11 is a section view of the terminal and terminal cover assembly in an engaged state taken along line 10-10 of FIG. 9.

The cap 302 can include a cylindrical outer wall 308 and a plurality of concentric cylindrical inner tab segments 310 connected to one another by a plurality of spokes 312 that extend radially outward from the cylindrical inner tab segments 310 to the cylindrical outer wall 308. As best shown in FIG. 8, the cylindrical outer wall 308 can include one or more relief cutouts 314 along an upper edge 316 of of the cylindrical outer wall 308. The plurality of spokes 312 are integrally formed with the cylindrical outer wall 308 and the cylindrical inner tab segments 310 and extend radially inward from the outer wall 308 and between the cylindrical inner tab segments 310. As best shown in FIG. 10, the inner cylindrical tab segments 310 each include a radially outwardly extending ledge 318 adjacent a bottom surface 320 of the inner cylindrical tab segments 310. In addition, the inner cylindrical tab segments 310 include a radially inwardly extending taper 322 extending toward the bottom surface 320 to define a narrowing region 324 on the inner surface of the inner cylindrical tab segments 310 adjacent the bottom surface 320. The plurality of spokes 312 extend radially inward beyond an inner surface of the inner cylindrical tab segments 310 and are connected to and between respective pairs of adjacent inner cylindrical tab segments 310.

The cap 302 may be formed of an elastically deformable, insulating material, such as, for example, polyethylene, silicone rubber, neoprene, ABS plastic, polyurethane, or any other elastically deformable, insulating material. The cap 302 may also be formed of a material resistant to corrosion or decomposition from battery acid.

The insert 304 can include a circular top portion 330 with a post 332 extending from a bottom surface 334 of the circular top portion 330. The post 332 includes a first radially outwardly extending flange portion 336 and a second outwardly extending flange portion 338 extending therefrom. The first radially outwardly extending flange portion 336 is distal to the circular top portion 330 while the second outwardly extending flange portion 338 is proximal to the circular top portion 330. The first radially outwardly extending flange portion 336 has a smaller diameter than the second radially outwardly extending flange portion 338. In addition, the $2^{nd}$ radially outwardly extending flange portion 338 defines an upper ledge 340. The first and second radially outwardly extending flange portions 336, 338 are spaced from one another along the posts 332. The lower flange portion 336 has a smaller diameter than the upper flange 338 so that is provides less interference with the inner segments 310.

The patch 306 can be square in shape and have adhesive on both sides with a pair of sticker-like covers over the adhesive. The patch 306 has a hole 350 in the center. The purpose of the patch 306 is to give the consumer the option to place the cover assembly 300 anywhere the customer would like to store the cover assembly 300 for immediate access when ready to exchange the battery. The consumer can simply peel one side of the cover from the patch 306 and place the patch 306 on the bottom of the battery cap 302. The battery cap 302 can then be attached anywhere, such as a channel or void space in the battery compartment area of the appliance, or on the battery itself 302, so that it is easily accessible when needed.

Figure 12:
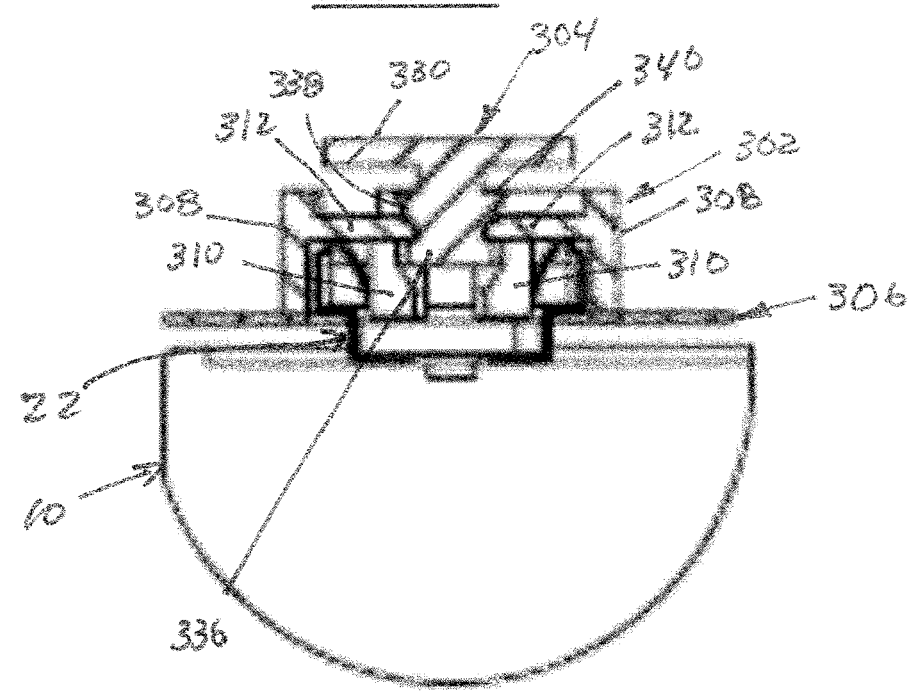
FIG. 12 is a section view of the terminal and terminal cover assembly in a disengaged state taken along line 11-11 of FIG. 9.
Figure 13:
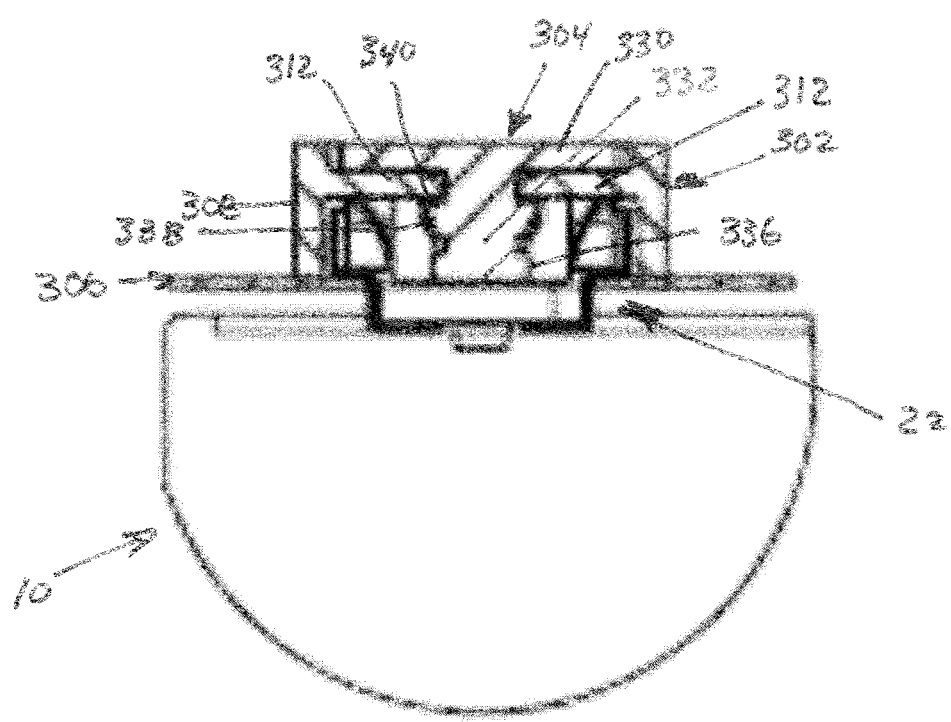
FIG. 13 is a section view of the terminal and terminal cover assembly in an engaged state taken along line 11-11 of FIG. 9.

In operation, the cap 302 with the patch 306 attached to its bottom surface is placed over top of the terminal 22 of the battery 10 so that the radially outwardly extending ledge 318 is engaged under the tabs 50 of the terminal 22. Then, as shown in FIG. 10, the post 332 of the insert 304 is inserted between the inner partial cylindrical tab segments 310. As shown in FIG. 12, the first radially outwardly extending flange 336 is received under the inner end portions of the spokes 312 in order to temporarily retain the insert 304 with the cap 302. By further inserting the insert 304 into the cap 302, the ledge 340 of the second outwardly extending flange 338 then becomes received under the inner end portions of the spokes 312 to permanently lock the cap 302 to the battery terminal 22 for proper disposal, as illustrated in FIG. 13.

The foregoing description of the embodiments has been provided for purposes of illustration and description. It is not intended to be exhaustive or are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery terminal protection assembly comprising:
   a battery having at least one terminal;
   a plurality of tabs extending from the terminal;
   a cover for protecting the battery terminal including:
   a cap including an outer wall and an inner segment attached to the outer wall and including a radially outwardly extending ledge adjacent the bottom surface of the inner segment, the cap being placed overtop of the terminal with the radially outwardly extending ledge engaging one of the plurality of tabs; and
   an insert including a top portion with a post extending from a bottom surface of the top portion and the post including a first radially outwardly extending flange, the post being received within the cap so that the first radially outwardly extending flange engages the inner segment in an abutting relationship to secure the radially outwardly extending ledge in engagement with the one of the plurality of tabs.

2. The battery terminal protection assembly according to claim 1, wherein the inner segment includes a plurality of inners segments.

3. The battery terminal protection assembly according to claim 2, wherein the plurality of inner segments include a radially inwardly extending taper extending toward the bottom surface of the inner segments.

4. The battery terminal protection assembly according to claim 1, wherein said post of said insert includes a second radially outwardly extending flange axially spaced from the first radially outwardly extending flange along the post.

5. The battery terminal protection assembly according to claim 1, wherein the cap is formed of an elastically deformable material.

6. The battery terminal protection assembly according to claim 1, further comprising a patch attached to a bottom surface of the cap.

7. The battery terminal protection assembly according to claim 6, wherein the patch has adhesive on both sides thereof.

8. A cover assembly to protect a battery terminal, comprising:
   a cap including an outer wall and an inner segment attached to the outer wall and including a radially outwardly extending ledge adjacent a bottom surface of the inner segment; and
   an insert including a top portion with a post extending from a bottom surface of the top portion and the post including a first radially outwardly extending flange, the post being received within the cap so that the first radially outwardly extending flange engages the inner segment in an abutting relationship.

9. The cover assembly according to claim 8, wherein the inner segment includes a plurality of inner segments.

10. The cover assembly according to claim 9, wherein the plurality of inner segments include a radially inwardly extending taper extending toward the bottom surface of the inner segments.

11. The cover assembly according to claim 8, wherein said post of said insert includes a second radially outwardly extending flange axially spaced from the first radially outwardly extending flange along the post.

12. The cover assembly according to claim 11, wherein said second radially outwardly extending flange includes an upper ledge.

13. The cover assembly according to claim 8, wherein the cap is formed of an elastically deformable material.

14. The cover assembly according to claim 13, wherein the elastically deformable material includes one of polyethylene, silicone rubber, neoprene, ABS plastic or polyurethane.

15. The cover assembly according to claim 8, further comprising a patch attached to a bottom surface of the cap.

16. The cover assembly according to claim 15, wherein the patch has adhesive on both sides thereof.

17. A cap configured to cover a terminal of a battery, the cap comprising:
an outer wall;
a plurality of spokes extending radially inward from the outer wall;
a plurality of inner tab segments disposed between the plurality of spokes and including a radially inwardly extending taper extending toward the bottom surface of the inner tab segments and a radially outwardly extending ledge adjacent the bottom surface of the inner tab segments; and
wherein the plurality of spokes have an inner end that extend inward beyond the plurality of inner tab segments.

18. The cap of claim 17, wherein the cap is formed of an elastically deformable material.

19. The cap of claim 18, wherein the elastically deformable material includes one of polyethylene, silicone rubber, neoprene, ABS plastic, or polyurethane.

20. The cap of claim 17, wherein the outer wall is cylindrical in shape.

* * * * *